US012190861B2

(12) United States Patent
Agarwal et al.

(10) Patent No.: US 12,190,861 B2
(45) Date of Patent: Jan. 7, 2025

(54) ADAPTIVE SPEECH RECOGNITION METHODS AND SYSTEMS

(71) Applicant: HONEYWELL INTERNATIONAL INC., Charlotte, NC (US)

(72) Inventors: Jitender Kumar Agarwal, Bangalore (IN); Chaya Garg, Plymouth, MN (US); Vasantha Paulraj, Madurai (IN); Ramakrishnan Raman, Bangalore (IN); Mahesh Kumar Sampath, Madurai (IN); Mohan M Thippeswamy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 445 days.

(21) Appl. No.: 17/659,596

(22) Filed: Apr. 18, 2022

(65) Prior Publication Data

US 2022/0343897 A1 Oct. 27, 2022

(30) Foreign Application Priority Data

Apr. 22, 2021 (IN) .............................. 202111018599

(51) Int. Cl.
*G10L 15/22* (2006.01)
*B64D 11/00* (2006.01)
(Continued)

(52) U.S. Cl.
CPC ........ *G10L 15/063* (2013.01); *B64D 11/0015* (2013.01); *G10L 15/01* (2013.01);
(Continued)

(58) Field of Classification Search
CPC ....... G10L 15/063; G10L 15/06; G10L 15/01; G10L 15/19; G10L 15/30;
(Continued)

(56) References Cited

U.S. PATENT DOCUMENTS 6,992,626 B2  1/2006 Smith
7,184,863 B2  2/2007 Weineck
(Continued)

FOREIGN PATENT DOCUMENTS

CN   110335609 A   10/2019
DE   102009025530 A1   12/2010
(Continued)

OTHER PUBLICATIONS

Cardosi, Kim and Tracy Lennertz "Loss of Controller-Pilot Voice Communications in Domestic En Route Airspace."DOT-VNTSC-FAA-17-04, dated Feb. 2016.
(Continued)

Primary Examiner — Huyen X Vo
(74) Attorney, Agent, or Firm — Lorenz & Kopf LLP.

(57) ABSTRACT

Methods and systems are provided for assisting operation of a vehicle using speech recognition. One method involves analyzing a transcription of an audio communication with respect to the vehicle to characterize a nonstandard pattern within the transcription of the audio communication, obtaining a ground truth for the transcription of the audio communication, determining one or more performance metrics associated with the nonstandard pattern within the transcription based on a relationship between the transcription of the audio communication and the ground truth for the transcription, updating a speech recognition vocabulary for the vehicle to include the nonstandard pattern based at least in part on the one or more performance metrics and determining an updated speech recognition model for the vehicle using the updated speech recognition vocabulary and the audio communication.

20 Claims, 8 Drawing Sheets

(51) Int. Cl.
*G10L 15/01* (2013.01)
*G10L 15/06* (2013.01)
*G10L 15/19* (2013.01)
*G10L 15/30* (2013.01)

(52) U.S. Cl.
CPC .............. *G10L 15/19* (2013.01); *G10L 15/22* (2013.01); *G10L 15/30* (2013.01); *G10L 2015/0635* (2013.01); *G10L 2015/223* (2013.01)

(58) Field of Classification Search
CPC ....... G10L 2015/0635; G10L 2015/223; G10L 15/22; G10L 15/183; B64D 11/0015; B64D 11/00; B64D 47/08; B64D 43/00; B64D 47/00; G08G 5/0021; G08G 5/0052; G08G 5/00; G08G 5/0013
See application file for complete search history.

(56) References Cited

U.S. PATENT DOCUMENTS

| | | |
|---|---|---|
| 7,415,326 B2 | 8/2008 | Komer et al. |
| 7,668,719 B2 | 2/2010 | Nakagawa et al. |
| 7,733,903 B2 | 6/2010 | Bhogal et al. |
| 7,809,405 B1 | 10/2010 | Rand et al. |
| 7,881,832 B2 | 2/2011 | Komer et al. |
| 8,149,141 B2 | 4/2012 | Coulmeau et al. |
| 8,180,503 B2 | 5/2012 | Estabrook et al. |
| 8,280,741 B2 | 10/2012 | Colin et al. |
| 8,340,839 B2 | 12/2012 | Yogesha et al. |
| 8,681,040 B1 | 3/2014 | Rathinam et al. |
| 8,704,701 B2 | 4/2014 | Pschierer et al. |
| 8,768,698 B2 | 7/2014 | Mengibar et al. |
| 8,793,139 B1 | 7/2014 | Serban et al. |
| 8,812,316 B1 | 8/2014 | Chen |
| 8,909,392 B1 | 12/2014 | Carrico |
| 8,957,790 B2 | 2/2015 | Cornell et al. |
| 9,047,870 B2 | 6/2015 | Ballinger et al. |
| 9,190,073 B2 | 11/2015 | Dong et al. |
| 9,443,433 B1 | 9/2016 | Conway et al. |
| 9,487,167 B2 | 11/2016 | Graumann et al. |
| 9,620,119 B2 | 4/2017 | Bilek et al. |
| 9,642,184 B2 | 5/2017 | Plocher et al. |
| 9,665,645 B2 | 5/2017 | Hawley |
| 9,666,178 B2 | 5/2017 | Loubiere et al. |
| 9,704,405 B2 | 7/2017 | Kashi et al. |
| 9,830,829 B1 | 11/2017 | Doyen et al. |
| 9,881,608 B2 | 1/2018 | Lebeau et al. |
| 10,056,085 B2 | 8/2018 | Klose et al. |
| 10,204,430 B2 | 2/2019 | Gowda |
| 10,490,085 B2 | 11/2019 | Cotdeloup et al. |
| 10,535,351 B2 | 1/2020 | Gaston et al. |
| 10,818,192 B2 | 10/2020 | Chen et al. |
| 2004/0124998 A1 | 7/2004 | Dame |
| 2004/0263381 A1 | 12/2004 | Mitchell et al. |
| 2005/0144187 A1 | 6/2005 | Che et al. |
| 2005/0203700 A1 | 9/2005 | Merritt |
| 2006/0229873 A1 | 10/2006 | Eide et al. |
| 2007/0189328 A1 | 8/2007 | Judd |
| 2007/0288128 A1 | 12/2007 | Komer et al. |
| 2008/0201148 A1 | 8/2008 | Desrochers |
| 2011/0028147 A1 | 2/2011 | Calderhead, Jr. et al. |
| 2011/0125503 A1 | 5/2011 | Dong et al. |
| 2011/0137653 A1 | 6/2011 | Ljolje et al. |
| 2011/0202351 A1 | 8/2011 | Plocher et al. |
| 2011/0231036 A1 | 9/2011 | Yogesha et al. |
| 2012/0078448 A1 | 3/2012 | Dorneich et al. |
| 2013/0093612 A1 | 4/2013 | Pschierer et al. |
| 2013/0103297 A1 | 4/2013 | Bilek et al. |
| 2015/0081138 A1 | 3/2015 | Lacko et al. |
| 2015/0162001 A1 | 6/2015 | Kar et al. |
| 2015/0212671 A1 | 7/2015 | Judy et al. |
| 2015/0212701 A1 | 7/2015 | Rodney et al. |
| 2016/0063999 A1* | 3/2016 | Gaston ................. G08G 5/0013 704/235 |
| 2016/0125744 A1 | 5/2016 | Shamasundar et al. |
| 2016/0155435 A1 | 6/2016 | Mohideen |
| 2016/0379640 A1 | 12/2016 | Joshi et al. |
| 2017/0039858 A1 | 2/2017 | Wang et al. |
| 2018/0061243 A1 | 3/2018 | Shloosh |
| 2019/0147858 A1 | 5/2019 | Letsu-Dake et al. |
| 2019/0244528 A1 | 8/2019 | Srinivasan et al. |
| 2020/0322040 A1 | 10/2020 | Middlestead et al. |
| 2020/0372916 A1 | 11/2020 | Delpech |
| 2021/0020168 A1* | 1/2021 | Dame .................. G08G 5/0013 |
| 2021/0233411 A1* | 7/2021 | Saptharishi ............. G10L 15/26 |
| 2021/0295840 A1 | 9/2021 | John et al. |

FOREIGN PATENT DOCUMENTS

| | | |
|---|---|---|
| EP | 0613110 A1 | 8/1994 |
| EP | 0618565 A2 | 10/1994 |
| EP | 1318492 A2 | 6/2003 |
| EP | 2026328 A1 | 2/2009 |
| EP | 3664065 A1 | 6/2020 |
| EP | 3889947 A1 | 10/2021 |
| FR | 3032574 A1 | 8/2016 |
| FR | 3032575 A1 | 8/2016 |
| FR | 3009759 B1 | 3/2017 |
| IN | 111785257 A | 10/2020 |
| WO | 2016076939 A1 | 5/2016 |

OTHER PUBLICATIONS

"Air-Ground Voice Communications," SKYbrary, downloaded from Internet Mar. 28, 2018.
"Loss of Communication," SKYbrary, downloaded from Internet Mar. 28, 2018.
Saptharishi, et al. Contextual Speech Recognition Methods and Systems; Filed with the USPTO on Jun. 22, 2021 and assigned U.S. Appl. No. 17/354,580.

* cited by examiner

FIG. 8

| | |
|---|---|
| LEAVE (significant point) HEADING (three digits). | Standard |
| CONTINUE HEADING (three digits). | Standard |
| CONTINUE PRESENT HEADING. | Standard |
| FLY HEADING (three digits). | Standard |
| TURN LEFT HEADING (three digits) [reason]. | Standard |
| TURN RIGHT HEADING (three digits) [reason]. | Standard |
| TURN LEFT HEADING (number of degrees) DEGREES [reason]. | Standard |
| TURN RIGHT HEADING (number of degrees) DEGREES [reason]. | Standard |
| STOP TURN HEADING (three digits). | Standard |
| FLY HEADING (three digits), WHEN ABLE PROCEED DIRECT (name) (significant point). | Standard |
| HEADING IS GOOD. | Standard |
| FLY PRESENT HEADING | Nonstandard |
| LEFT TURN HEADING (three digits) | Nonstandard |
| TURN LEFT (three digits) HEADING | Nonstandard |
| FLY (three digits) HEADING | Nonstandard |
| FLY RUNWAY HEADING | Nonstandard |
| HEADING WOULD BE (three digits) | Nonstandard |
| TURN ANOTHER (two digits) DEGREES RIGHT HEADING (three digits) | Nonstandard |
| (three digits) HEADING | Nonstandard |
| ON [word] HEADING | Nonstandard |
| HEADING (three digits) | Nonstandard |
| TURN OFF HEADING (three digits) | Nonstandard |
| HEADING [direction] | Nonstandard |
| FLY HEADING OF (three digits) | Nonstandard |

ADAPTIVE SPEECH RECOGNITION METHODS AND SYSTEMS

CROSS REFERENCE TO RELATED APPLICATION

This application claims priority to Indian Provisional Patent Application No. 202111018599, filed Apr. 22, 2021, the entire content of which is incorporated by reference herein.

TECHNICAL FIELD

The subject matter described herein relates generally to vehicle systems, and more particularly, embodiments of the subject matter relate to adaptive speech recognition models for interfacing with aircraft systems and related cockpit displays using air traffic control communications.

BACKGROUND

Air traffic control typically involves voice communications between air traffic control and a pilot or crewmember onboard the various aircrafts within a controlled airspace. For example, an air traffic controller (ATC) may communicate an instruction or a request for pilot action by a particular aircraft using a call sign assigned to that aircraft, with a pilot or crewmember onboard that aircraft acknowledging the request (e.g., by reading back the received information) in a separate communication that also includes the call sign. As a result, the ATC can determine that the correct aircraft has acknowledged the request, that the request was correctly understood, what the pilot intends to do, etc., and take appropriate steps if any remedies are required.

Unfortunately, there are numerous factors that can complicate clearance communications, or otherwise result in a misinterpretation of a clearance communication, such as, for example, the volume of traffic in the airspace, similarities between call signs of different aircrafts in the airspace, congestion or interference on the communications channel being utilized, and/or human fallibilities (e.g., inexperience, hearing difficulties, memory lapse, language barriers, dialect/accent variations, distractions, fatigue, etc.). Standard phraseology exists to limit the opportunity for misunderstanding and enable quick and effective communications despite language differences. However, there are circumstances where plain language communications may become necessary and occurrences in practice where exact conformance to standard phraseology may be missed, which can result in use of ambiguous or non-standard phraseology that could pose other risks. Accordingly, it is desirable to provide aircraft systems and methods that mitigate potential miscommunications between an aircraft and ATC and facilitate adherence to ATC clearances or commands with improved accuracy. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle using speech recognition. One method involves analyzing a transcription of an audio communication with respect to the vehicle to characterize a nonstandard pattern within the transcription of the audio communication, obtaining a ground truth for the transcription of the audio communication, determining one or more performance metrics associated with the nonstandard pattern within the transcription based on a relationship between the transcription of the audio communication and the ground truth for the transcription, updating a speech recognition vocabulary for the vehicle to include the nonstandard pattern based at least in part on the one or more performance metrics and determining an updated speech recognition model for the vehicle using the updated speech recognition vocabulary and the audio communication.

In another embodiment, an apparatus is provided for a computer-readable medium having computer-executable instructions stored thereon that, when executed by a processing system, cause the processing system to analyze a transcription of an audio communication with respect to a vehicle to characterize a pattern within the transcription of the audio communication, obtain a ground truth for the transcription of the audio communication, determine one or more performance metrics associated with the pattern within the transcription based on a relationship between the transcription of the audio communication and the ground truth for the transcription, update a speech recognition vocabulary to include the pattern based at least in part on the one or more performance metrics and determine an updated speech recognition model for the vehicle using the updated speech recognition vocabulary and the audio communication.

In another embodiment, an apparatus for a computing device is provided that includes at least one computer-readable storage medium to store computer-executable instructions and at least one processor, coupled to the at least one computer-readable storage medium, to execute the computer-executable instructions. The execution of the computer-executable instructions cause the at least one processor to analyze a transcription of an audio communication with respect to a vehicle to characterize a pattern within the transcription of the audio communication, obtain a ground truth for the transcription of the audio communication, determine one or more performance metrics associated with the pattern within the transcription based on a relationship between the transcription of the audio communication and the ground truth for the transcription, update a speech recognition vocabulary to include the pattern based at least in part on the one or more performance metrics and determine an updated speech recognition model for the vehicle using the updated speech recognition vocabulary and the audio communication.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and:

FIG. 8 is a table depicting examples of standard phraseology patterns and nonstandard phraseology patterns suitable for use with the system of FIG. 3 in connection with one or more of the processes of FIGS. 4-6 in accordance with one or more exemplary embodiments.

DETAILED DESCRIPTION

Figure 1:
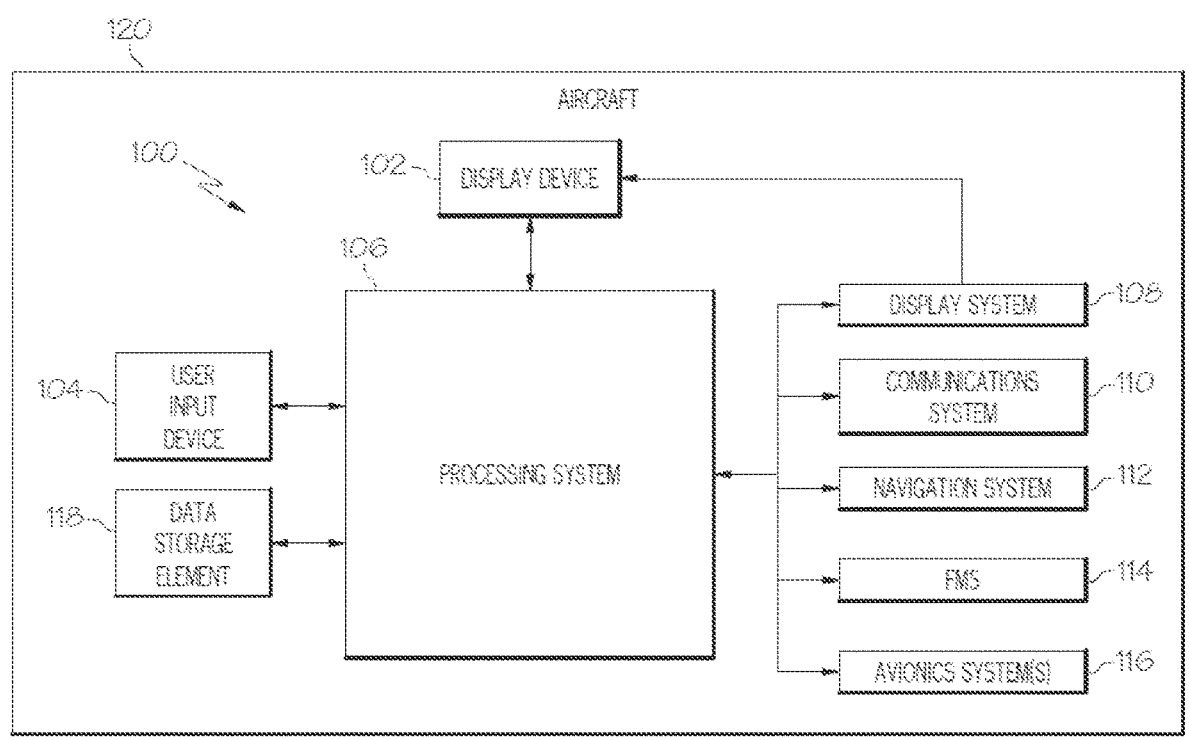
FIG. 1 is a block diagram illustrating a system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods that facilitate a vehicle operator operating a vehicle in a controlled area by mitigating potential miscommunications with a controller. For purposes of explanation, the subject matter may be primarily described herein in the context of aircraft operating in a controlled airspace; however, the subject matter described herein is not necessarily limited to aircraft or avionic environments, and in alternative embodiments, may be implemented in an equivalent manner for automobiles or ground operations, vessels or marine operations, or otherwise in the context of other types of vehicles and travel spaces.

In one or more embodiments, an aircraft system includes a transcription system that utilizes speech recognition to transcribe audio clearance communications received at the aircraft. For example, audio communications received at the aircraft may be parsed and analyzed using natural language processing to identify or otherwise map an air traffic control (ATC) clearance to particular parameters, settings and/or the like. For purposes of explanation, the transcription system may alternatively be referred to herein as an ATC transcription system or variants thereof. In some embodiments, the ATC transcription system utilizes a speech engine to convert the stream of audio communications received from communications radios or other onboard communications systems into human readable text that can be displayed on a flight deck display, an electronic flight bag, and/or the like.

In some embodiments, ATC clearance communications associated with different aircraft concurrently operating in a commonly controlled airspace (or alternatively airspaces that are not commonly controlled but adjacent or otherwise within a threshold distance of one another) are continually monitored to identify instructions from the ATC pertaining to onboard system settings or configurations, such as, for example, radio frequency assignments, altimeter settings, and/or the like. Speech recognition is utilized to translate or otherwise transcribe the audio content of the clearance communications into corresponding textual representations, which, in turn, may be analyzed to extract relevant information from the transcribed communication. For each clearance communication including an instruction, one or more of an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), an aircraft action associated with the clearance communication (e.g., landing, takeoff, pushback, hold, or the like), and/or an identifier contained within the clearance communication (e.g., a flight identifier, call sign, or the like) may be identified or otherwise determined and stored or maintained in association with the clearance communication. The operational context associated with the aircraft that is the intended recipient of the instruction may also be identified or otherwise determined and stored or maintained in association with the transcribed clearance communication and extracted parameters to create a mapping between the recipient aircraft's operational context at the time of the instruction and the content of the instruction.

In some embodiments, the aircraft system also includes a command system that receives or otherwise obtains voice commands, analyzes the audio content of the voice commands using speech recognition, and outputs control signals to the appropriate onboard system(s) to effectuate the voice command(s). For purposes of explanation, the command system may alternatively be referred to herein as Voice Activated Flight Deck (VAFD) system or variants thereof. In some VAFD implementations, both the pilot and co-pilot side of the cockpit includes hardware or other components configured to support commanding one or more onboard systems using voice modality for performing certain flight deck functions. In this regard, pilot and co-pilot can independently and simultaneously use the VAFD system to perform their tasks. Some VAFD systems include a speech recognition engine that utilizes acoustic and language models to convert the content of received audio or speech into particular commands that the onboard system(s) are configured to respond to.

In some embodiments, the extracted parameters from the ATC clearances may be utilized by the VAFD system to dynamically vary the speech recognition models and/or the speech recognition vocabulary utilized by the VAFD system in a context-sensitive manner that reflects the ATC clearances relevant to the ownship aircraft. For example, as described in U.S. patent application Ser. No. 17/354,580, ATC clearance communications may be utilized to contextually predict, forecast or otherwise anticipate likely voice commands and dynamically adjust the speech recognition models and/or vocabularies to recognize voice commands with improved accuracy and reduced response time. For example, in one or more implementations, a speech recognition engine is implemented using two components, an acoustic model and a language model, where the language model is implemented as a finite state graph configurable to function as or otherwise support a finite state transducer, where the acoustic scores from the acoustic model are utilized to compute probabilities for the different paths of the finite state graph, with the highest probability path being recognized as the desired user input which is output by the speech recognition engine to an onboard system. In this regard, by dynamically limiting the search space for the language model, the probabilistic pass through the speech recognition graph is more likely to produce an accurate result with less time required (e.g., by virtue of limiting the search space). Likewise, limiting the potential vocabulary for the acoustic model may allow the voice command audio input to be converted into a textual representation to be input to the language model with improved accuracy and reduced response time.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In the illustrated embodiment, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
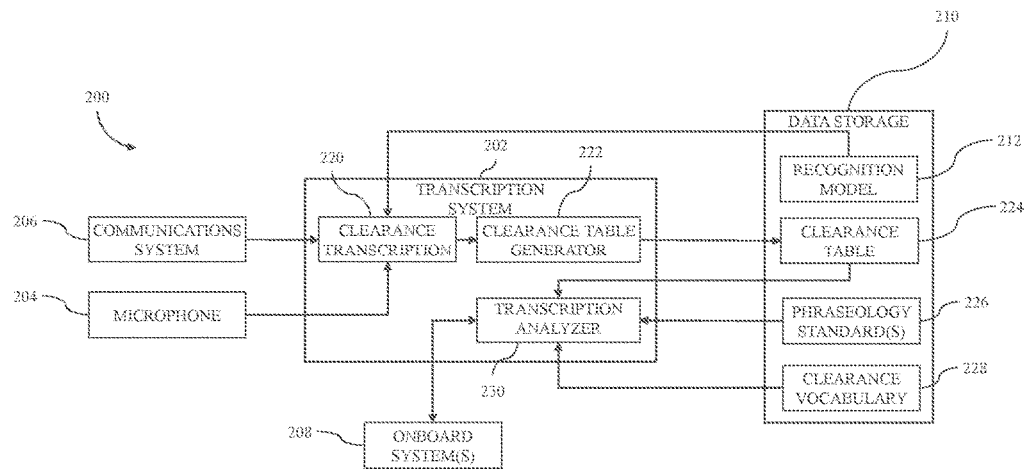
FIG. 2 is a block diagram illustrating a speech recognition system suitable for use with the aircraft system of FIG. 1 in accordance with one or more exemplary embodiments.

FIG. 2 depicts an exemplary embodiment of a speech recognition system 200 for transcribing speech, voice commands or any other received audio communications (e.g., broadcasts received from the automatic terminal information service (ATIS)). In one or more exemplary embodiments, the speech recognition system 200 is implemented or otherwise provided onboard a vehicle, such as aircraft 120; however, in alternative embodiments, the speech recognition system 200 may be implemented independent of any aircraft or vehicle, for example, at an EFB or other client electronic device, or at a ground location such as an air traffic control facility. That said, for purposes of explanation, the speech recognition system 200 may be primarily described herein in the context of an implementation onboard an aircraft. The illustrated speech recognition system 200 includes a transcription system 202, an audio input device 204 (or microphone) and one or more communications systems 206 (e.g., communications system 110). The transcription system 202 is also coupled to one or more onboard systems 208 (e.g., one or more avionics systems 108, 110, 112, 114, 116) to provide output signals or other indicia to a desired destination onboard system 208 (e.g., via an avionics bus or other communications medium). It should be understood that FIG.

2 is a simplified representation of the speech recognition system 200 for purposes of explanation and ease of description, and FIG. 2 is not intended to limit the application or scope of the subject matter described herein in any way.

The transcription system 202 generally represents the processing system or component of the speech recognition system 200 that is coupled to the microphone 204 and communications system(s) 206 to receive or otherwise obtain audio clearance communications and other audio communications, analyze the audio content of the clearance communications, and transcribe the audio content of the clearance communications, as described in greater detail below. Depending on the embodiment, the transcription system 202 may be implemented as a separate standalone hardware component, while in other embodiments, the features and/or functionality of the transcription system 202 may be integrated with and/or implemented using another processing system (e.g., processing system 106). In this regard, the transcription system 202 may be implemented using any sort of hardware, firmware, circuitry and/or logic components or combination thereof. For example, depending on the embodiment, the transcription system 202 may be realized as a general purpose processor, a content addressable memory, a digital signal processor, an application specific integrated circuit, a field programmable gate array, any suitable programmable logic device, discrete gate or transistor logic, processing core, a combination of computing devices (e.g., a plurality of processing cores, a combination of a digital signal processor and a microprocessor, a plurality of microprocessors, one or more microprocessors in conjunction with a digital signal processor core, or any other such configuration), discrete hardware components, or any combination thereof, designed to perform the functions described herein.

The audio input device 204 generally represents any sort of microphone, audio transducer, audio sensor, or the like capable of receiving voice or speech input. In this regard, in one or more embodiments, the audio input device 204 is realized as a microphone (e.g., user input device 104) onboard the aircraft 120 to receive voice or speech annunciated by a pilot or other crewmember onboard the aircraft 120 inside the cockpit of the aircraft 120. The communications system(s) 206 (e.g., communications system 110) generally represent the avionics systems capable of receiving clearance communications from other external sources, such as, for example, other aircraft, an air traffic controller, or the like. Depending on the embodiment, the communications system(s) 206 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio content into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like, and the transcription system 202 may include or otherwise access a data storage element 210 (or memory) that stores one or more speech recognition models 212 and a corresponding speech recognition vocabulary (e.g., clearance vocabulary 228) for use by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 204, a radio communications system 206, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 206 (e.g., a CPDLC system). The clearance table generator 222 parses or otherwise analyzes the textual representation of the received clearance communications and generates corresponding clearance communication entries in a table 224 in the memory 210. In this regard, the clearance table 224 maintains all of the clearance communications received by the transcription system 202 from either the onboard microphone 204 or an onboard communications system 206.

In exemplary embodiments, for each clearance communication received by the clearance table generator 222, the clearance table generator 222 parses or otherwise analyzes the textual content of the clearance communication using natural language processing and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 224 that maintains an association between the textual content of the clearance communication and the identified fields associated with the clearance communication. Additionally, the clearance table generator 222 may analyze the new clearance communication entry relative to existing clearance communication entries in the clearance table 224 to identify or otherwise determine a conversational context to be assigned to the new clearance communication entry (e.g., whether a given communication corresponds to a request, a response, an acknowledgment, and/or the like).

Still referring to FIG. 2, in one or more embodiments, the processor, control module, or other hardware associated with the transcription system 202 executes computer-executable programming instructions that cause the transcription system 202 to generate, execute, or otherwise implement a transcription analysis application 230 (or transcription analyzer) capable of analyzing, parsing, or otherwise processing transcriptions of received audio communications along with their associated fields of data maintained in the clearance table 224 to detect or otherwise identify when a respective received audio communication does not comply with phraseology standards information 226 maintained in the data storage element 210. In this regard, the phraseology standards information 226 may include reference phraseologies, verbiage, syntactical rules and/or other syntactical information that define or otherwise delineate the applicable phraseology standard(s) for the aircraft at the current geographic location of the aircraft, which may be set forth by the International Civil Aviation Organization (ICAO) standards (e.g., Annex 10 Volume II Chapter 5, ICAO Doc 4444 Chapter 12 and in ICAO Doc 9432—Manual of Radiotelephony or another applicable phraseology standard for the particular geographic region or airspace), the Federal Aviation Authority (FAA), or another regulatory body or organization. For example, the phraseology standards 226 may be maintained as a syntactic semantic mapping in a set of templates and/or rules that are saved or otherwise stored as a configuration file associated with the transcription analysis application 230. Additionally, the data storage element 210 may maintain a clearance vocabulary 228 that includes the potential words, alphanumeric values, terms and/or phrases that are likely to be utilized in the context of ATC clearance communications.

In some embodiments, the transcription analyzer 230 utilizes the applicable phraseology standard(s) 226 in concert with the clearance vocabulary 228 to perform semantical and syntactical analysis and automatically identify discrepancies between a transcribed clearance communication and an expected clearance communication according to a standard phraseology pattern set forth by one or more phraseology standards 226 or a nonstandard phraseology pattern prescribed by the clearance vocabulary 228, as described in greater detail below. In response, the transcription analyzer 230 may automatically generate, transmit, or otherwise provide output signals indicative of a detected discrepancy to a display system 108, 208 or another onboard system 208 to notify the pilot or initiate other remedial action when a received audio clearance communication includes nonstandard phraseology or incomplete information. Additionally, the transcription analyzer 230 may tag or otherwise mark a transcribed clearance communication in the clearance table 224 as including a discrepancy for subsequent analysis and adaptively updating the recognition model 212 and/or the clearance vocabulary 228, as described in greater detail below.

FIG. 8 depicts some examples of standard phraseology patterns and nonstandard phraseology patterns for ATC clearance communications related to aircraft heading. For example, a standard phraseology pattern for an ATC heading instruction may be realized as "FLY HEADING <heading value>," where <heading value> represents a placeholder for three numerical digits that define the assigned or instructed heading value from the ATC, while a corresponding nonstandard phraseology pattern for a similar ATC heading instruction may be realized as "FLY <heading value> HEADING." In some embodiments, the nonstandard phraseology patterns may also be specific or limited to particular geographic regions or locations. As described in U.S. patent application Ser. No. 17/412,012, in some implementations, a transcribed clearance communication may be automatically augmented to mitigate potential discrepancies and reduce the likelihood of confusion or other miscommunication during operation of the aircraft. In this regard, in some implementations, the transcription of the nonstandard phraseology pattern (e.g., "FLY ZERO THREE ZERO HEADING") may be automatically augmented or otherwise modified to reflect the standard phraseology pattern (e.g., by transposing the assigned heading value with the heading term) such that the pilot or other aircraft operator reviewing the transcribed ATC clearance communications perceives the ATC heading instruction as being in accordance with the standard phraseology pattern (e.g., "FLY HEADING ZERO THREE ZERO") to reduce likelihood of confusion or other miscommunication that could be attributable to a nonstandard phraseology pattern.

Figure 3:
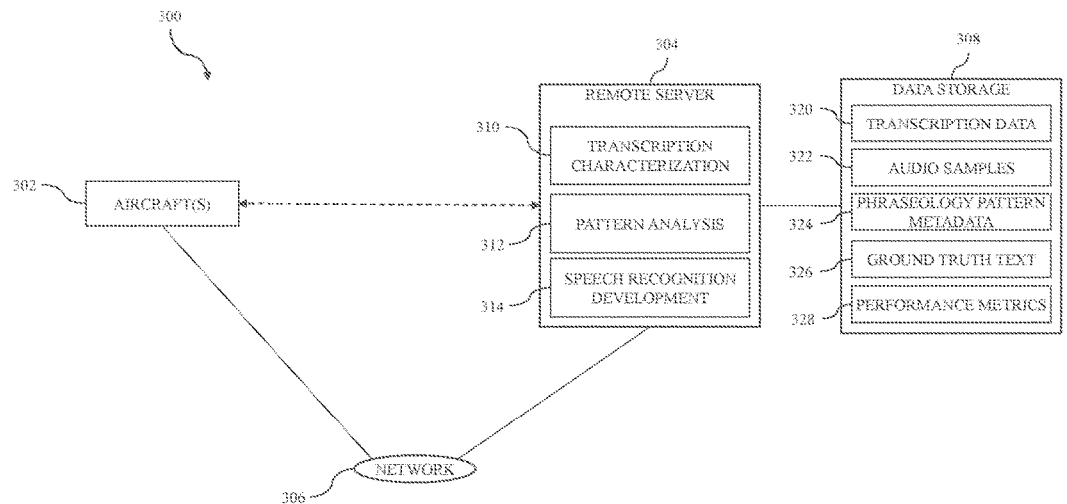
FIG. 3 is a block diagram illustrating a system for analyzing transcribed audio communications in connection with the transcription system of FIG. 2 in accordance with one or more exemplary embodiments.

FIG. 3 depicts an exemplary system 300 for analyzing transcribed clearance communications obtained at any number of edge electronic devices, such as, for example, one or more EFBs or other computing devices or systems associated with any number of aircraft 302. Referring to FIG. 3 with reference to FIGS. 1-2, in the illustrated implementation, the transcribed clearance communications generated by the speech recognition system 200 and/or the transcription system 202 onboard instances of the aircraft 120, 302 are transferred, uploaded or otherwise transmitted to a remote computing system 304 over a communications network 306, such as the Internet, a satellite network, a cellular network, a wireless network, a data link infrastructure, a data link service provider, a radio network, or the like.

Still referring to FIG. 3, the remote computing system 304 generally represents a server or other computing device, which may be located at a ground operations center or other facility located on the ground that is equipped to track, analyze and/or monitor operations of one or more aircraft 120, 302. In exemplary embodiments, the remote computing system 304 includes a processing system and a data storage element. The processing system generally represents the hardware, circuitry, processing logic, and/or other components configured to support or otherwise perform aspects of one or more processes, tasks and/or functions described herein to analyze transcribed clearance communications, as described in greater detail below. Depending on the embodiment, the processing system may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The data storage element generally represents any sort of memory or other computer-readable medium (e.g., RAM memory, ROM memory, flash memory, registers, a hard disk, or another suitable non-transitory short- or long-term storage media), which is capable of storing computer-executable programming instructions or other data for execution that, when read and executed by the processing system, cause the processing system to execute and perform one or more of the processes tasks, operations, and/or functions described herein.

In the illustrated embodiment, the remote computing system 304 is coupled to a database, repository or other data storage 308 that is capable of storing or otherwise maintaining transcription data 320 that includes the transcribed clearance communications received from different instances of the aircraft 120, 302. For at least a subset of the transcribed clearance communications, the data storage 308 also stores or otherwise maintains the audio of the clearance communications associated with respective transcribed clearance communications as an audio sample 322 associated with the transcription data 320 for the respective clearance communication.

In exemplary implementations, the memory stores programming instructions that, when executed by the processing system at the remote computing system, cause the processing system to create, generate, or otherwise facilitate a transcription characterization service 310 that is configurable to analyze transcribed clearance communications to classify or otherwise categorize transcribed clearance communications based upon speech patterns detected therein, assign corresponding speech pattern metadata to the transcribed clearance communications, and then store or otherwise maintain phraseology data 324 including the speech pattern classifications and metadata in association with the transcription data 320 and/or the audio sample 322 for a respective clearance communication. Additionally, in the illustrated implementation, the remote computing system 304 also executes, generates or otherwise facilitates a pattern analysis service 312 that is configurable to analyze transcribed clearance communications with respect to a corresponding corpus of ground truth text 326 to determine different performance metrics 328 associated with the transcribed clearance communications based on the respective speech patterns detected therein, and then store or otherwise maintain the performance metrics 328 in association with the transcription data 320, the audio sample 322 and/or the phraseology data 324 for a respective clearance communication.

In the illustrated implementation, the remote computing system 304 also executes, generates or otherwise facilitates a speech recognition development service 314 that is configurable to analyze the performance metrics 328 to adaptively update the speech recognition vocabulary and/or the speech recognition model(s) utilized by the aircraft 302 to improve performance over time. For example, when the phraseology data 324 indicates increasing prevalence of new or nonstandard patterns, but the recognition performance with respect to those patterns is lagging, the speech recognition model development service 314 may update the speech recognition vocabulary to include or otherwise incorporate new, nonstandard patterns and then retrain the speech recognition model(s) to improve the performance of the clearance transcription application 220 with respect to the new, nonstandard pattern. Additionally, or alternatively, the speech recognition model development service 314 may analyze the phraseology data 324 and/or the performance metrics 328 to identify predefined or standard patterns or phrases that have become obsolete or are otherwise no longer in use, and in turn, update the speech recognition vocabulary to remove underutilized or obsolete patterns and then retrain the speech recognition model(s) to improve the performance of the clearance transcription application 220 with respect to the remaining patterns or phrases in the updated speech recognition vocabulary by deemphasizing unused phraseology. When the speech recognition model development service 314 updates the speech recognition vocabulary and/or the speech recognition model(s), the remote server 304 may push or otherwise transmit the updated speech recognition vocabulary and/or the speech recognition model(s) to the aircraft 302 to dynamically adapt and update the speech recognition model(s) 212, the phraseology standard(s) 226 and/or the clearance vocabulary 228 at the aircraft 302 to reflect the up-to-date, real-world usage of patterns and phraseology.

Figure 4:
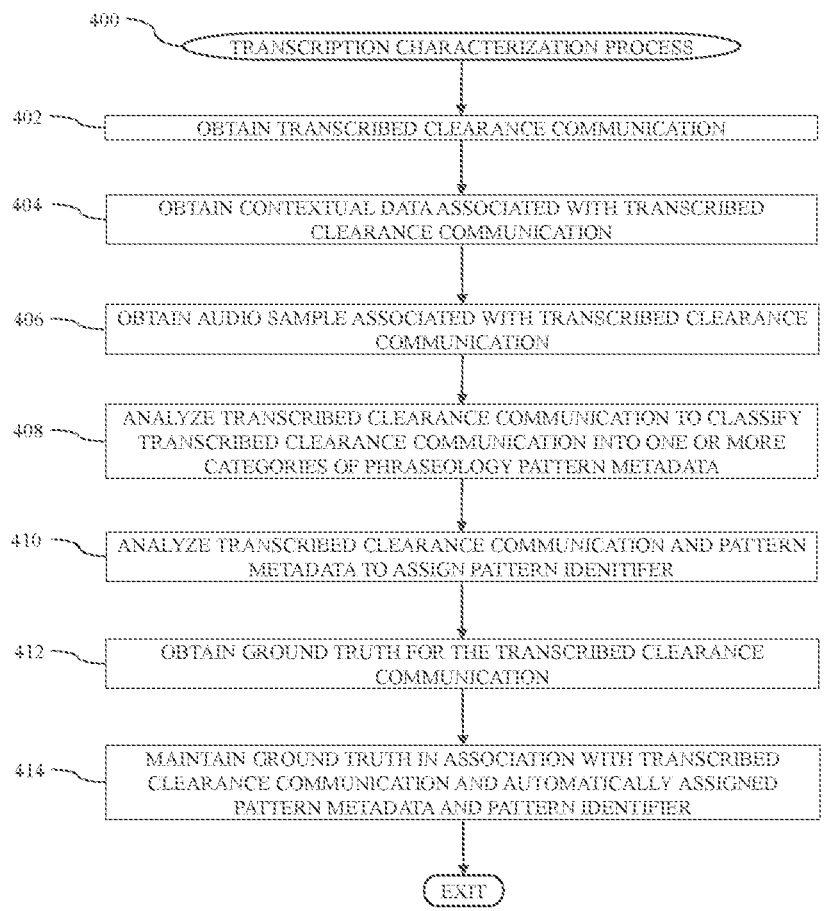
FIG. 4 is a flow diagram illustrating a transcription characterization process suitable for implementation by the system of FIG. 3 in accordance with one or more exemplary embodiments.

FIG. 4 depicts an exemplary embodiment of a transcription characterization process 400 to support analyzing transcriptions to detect or otherwise identify patterns or phrases within transcriptions for classifying transcriptions into different categories and assigning corresponding metadata for subsequent analysis of the transcriptions. The various tasks performed in connection with the transcription characterization process 400 may be implemented using hardware, firmware, software executed by processing circuitry, or any combination thereof. For illustrative purposes, the following description may refer to elements mentioned above in connection with FIGS. 1-3. In practice, portions of the transcription characterization process 400 may be performed by different elements of the systems 100, 200, 300; however, for purposes of explanation, the transcription characterization process 400 may be described herein primarily in the context of being implemented by the remote server 304 and/or the transcription characterization service 310. It should be appreciated that the transcription characterization process 400 may include any number of additional or alternative tasks, the tasks need not be performed in the illustrated order and/or the tasks may be performed concurrently, and/or the transcription characterization process 400 may be incorporated into a more comprehensive procedure or process having additional functionality not described in detail herein. Moreover, one or more of the tasks shown and described in the context of FIG. 4 could be omitted from a practical embodiment of the transcription characterization process 400 as long as the intended overall functionality remains intact.

The transcription characterization process 400 begins by receiving or otherwise obtaining a transcription of an audio clearance communication along with the contextual data associated with the clearance communication and the corresponding audio of the clearance communication (tasks 402, 404, 406). For example, during or after a flight, the speech recognition system 200 onboard an aircraft 120, 302 may transfer, upload, or otherwise transmit, to the remote server 304 over the network 306, transcribed clearance communications and associated contextual data from the clearance table 224 along with a corresponding audio file that includes the received audio from which a respective transcribed clearance communication was derived. For a transcribed clearance communication, the remote server 304 and/or the transcription characterization service 310 creates a corresponding record or entry at the data storage 308 that stores or otherwise maintains the transcription data 320 including transcribed clearance communication and its associated contextual data in association with the audio sample 322 that contains the audio from which the respective transcribed clearance communication was derived. In this manner, the remote server 304 and/or the data storage 308 may collect or otherwise aggregate transcribed clearance communications from multiple different flights and from multiple different aircraft 120, 302 for analysis.

The transcription characterization process 400 continues by analyzing the transcribed clearance communication to automatically classify the transcribed clearance communication into one or more categories of phraseology pattern metadata (task 408). In this regard, the transcription characterization service 310 utilizes natural language processing (NLP), machine learning or artificial intelligence (AI) techniques to perform semantic analysis (e.g., parts of speech tagging, position tagging, and/or the like) on the transcribed audio communication to identify the subject or operational objective of the communication, whether or not the transcribed clearance communication includes a phraseology pattern related to the subject or operational objective, and whether or not the transcribed clearance communication defines data or other values for one or more parameters related to the subject or operational objective. For example, the transcribed audio communication may be classified into a particular subject category that the communication pertains to (e.g., heading, flight level, altimeter setting, etc.) and a particular phraseology pattern structure category that indicates what type of structured phraseology pattern (or phraseology pattern structure type) is included in the transcribed audio communication (e.g., no phraseology pattern, a phraseology pattern only, or a phraseology pattern with accompanying data).

For example, to identify the heading patterns such as shown in FIG. 8, the following NLP regular expressions (regex) patterns may be utilized, where '\w' represents a word and '\d' represents a digit: SAY (\w*.)?HEADING; RUNWAY (\w*.)?HEADING; HEADING (\w*.)?IS (\w*.)?GOOD; FLY (\w*.)?PRESENT (\w*.)?HEADING; ON \w* HEADING; \d.\d.\d.ON.(\w*.)?THE.(\w*.)?HEADING; HEADING.(\w*.)?\d.\d.\d(.)?; \d.\d.\d.(\w*.)?HEADING; LEAVE\w* HEADING.\d.\d.\d; CONTINUE (\w*.)?PRESENT (\w*.)?HEADING; FLY.(\w*.)?HEADING.(\w*.)?\d.\d.\d; LEFT (\w*.)?HEADING.(\w*.)?\d.\d.\d; TURN (\w*.)?LEFT (\w*.)?HEADING.(\w*.)?\d.\d.\d; TURN.(\w*.)?RIGHT.(\w*.)?HEADING.(\w*.)\d.\d.\d; TURN.(\w*.)?LEFT.(\w*.)?HEADING.(\w*.)\d.\d.\d (\w*.)?DEGREES; TURN (\w*.)?RIGHT (\w*.)?HEADING (\w*.)?\d.\d.\d (\w*.)?DEGREES; STOP (\w*.)?TURN (\w*.)?HEADING.(\w*.)?\d.\d.\d; CONTINUE (\w*.)?HEADING.(\w*.)?\d.\d.\d; FLY.(\w*.)?HEADING.\d.\d.\d WHEN ABLE PROCEED DIRECT \w*; LEFT (\w*.)?TURN (\w*.)?HEADING.(\w*.)?\d.\d.\d; TURN (\w*.)?LEFT (\w*.)?\d.\d.\d.(\w*.)?HEADING; FLY (\w*.)?\d.\d.\d.(\w*.)?HEADING; FLY (\w*.)?HEADING (\w*.)?OF \d.\d.\d.; FLY (\w*.)?RUNWAY (\w*.)?HEADING; HEADING (\w*.)?WOULD (\w*.)?BE (\w*.)?\d.\d.\d; TURN (\w*.)?ANOTHER (\w*.)?\d.\d (\w*.)?DEGREES (\w*.)?RIGHT (\w*.)?HEADING (\w*.)?\d.\d.\d.; DEPART \w* HEADING.\d.\d.\d.; DEPART \w* HEADING (\w*.)?BE (\w*.)?VECTORS (\w*.)?RUNWAY; TURN (\w*.)?OFF (\w*.)?HEADING.(\w*.)?\d.\d.\d.

Still referring to FIG. 4, the transcription characterization process 400 continues by analyzing the transcribed clearance communication and assigned phraseology pattern category metadata to automatically assign a phraseology pattern identifier to the transcribed audio communication (task 410). In this regard, the transcription characterization service 310 utilizes NLP, AI or other semantic analysis in concert with the phraseology pattern subject category, the phraseology pattern structure type, and the operational objective or intent of the transcribed clearance communication to determine whether or not the transcribed audio communication corresponds to a standard phraseology pattern or a nonstandard phraseology pattern. For example, based on the intent, syntax and the content of the transcribed clearance communication, the transcription characterization service 310 may intelligently determine the most likely operational objective of the transcribed clearance communication (e.g., what the communication is intended to convey with respect to operation of the aircraft), identify one or more standard phraseology patterns for a clearance communication corresponding to the identified operational objective using the applicable phraseology standard(s) (e.g., using phraseology standard information 226, 324), and then determine whether or not the transcribed clearance communication matches the expected syntax for a standard clearance communication corresponding to the identified operational objective. In this regard, the transcription characterization service 310 attempts to verify or otherwise confirm that the transcription of the received audio communication includes the required operational subject(s), operational parameter(s) and/or action(s) specified by the phraseology standard(s) for the identified operational objective with the required order or syntax.

When the transcription of the received audio communication matches a standard clearance communication or otherwise includes the required components associated with the standard clearance communication in the same order as the standard clearance communication, the transcription characterization service 310 may tag or otherwise mark the transcribed clearance communication as including a standard phraseology pattern while also storing or otherwise maintaining an association between an identifier associated with the standard phraseology pattern and the transcribed clearance communication in the data storage 308. When the transcription of the received audio communication does not match a standard clearance communication, in a similar manner, the transcription characterization service 310 attempts to verify or otherwise confirm that the syntax and content of the transcribed audio communication matches a previously-recognized or predefined custom or nonstandard phraseology pattern that has been added to the speech recognition vocabulary. In this regard, the transcription characterization service 310 may query the transcription data 320 in the data storage 308 to identify whether the phraseology pattern identified within the transcribed audio communication matches a previously-identified nonstandard phraseology pattern. When the transcribed clearance communication matches a previously-recognized or previously-defined nonstandard phraseology pattern, the transcription characterization service 310 may tag or otherwise mark the transcribed clearance communication as including a nonstandard phraseology pattern and stores or otherwise maintains an association between an identifier associated with the nonstandard phraseology pattern and the transcribed clearance communication in the data storage 308.

On the other hand, when the transcribed clearance communication does not match any standard or other predefined phraseology patterns for the phraseology pattern subject category, and the phraseology pattern structure type and operational objective indicates the transcribed clearance communication includes a phraseology pattern, the transcription characterization service 310 may tag or otherwise mark the transcribed clearance communication as including a nonstandard phraseology pattern and automatically generate or otherwise assign a new, unique phraseology pattern identifier to the transcribed clearance communication. Thus, the unique phraseology pattern identifier may be utilized to tag or otherwise mark a subsequently transcribed audio communication when the syntax and content of the subsequently transcribed audio communication matches the automatically identified nonstandard phraseology pattern. That said, when the phraseology pattern structure type and operational objective associated with a transcribed clearance communication indicates the transcribed clearance communication does not include a phraseology pattern, the transcription characterization service 310 may tag or otherwise mark the transcribed clearance communication as not including a phraseology pattern (e.g., none).

Still referring to FIG. 4, in one or more implementations, the transcription characterization process 400 receives or otherwise obtains a ground truth text corresponding to the transcribed clearance communication and stores or otherwise maintains the ground truth text in association with the transcribed clearance communication and the automatically assigned phraseology pattern subject category (e.g., heading, flight level, altimeter setting, etc.), the phraseology pattern structure type (e.g., pattern only, pattern plus data, no pattern), and the phraseology pattern type (e.g., standard, nonstandard, custom, none) (tasks 412, 414). In this regard, the ground truth text corresponds to a manually transcribed and/or manually verified transcription of the audio sample 322 associated with a respective transcribed clearance communication that represents the true or accurate content of the clearance communication. Thus, for a transcribed clearance communication, the transcription characterization process 400 results in the data storage 308 maintaining a corresponding record or entry that stores or otherwise maintains an association between the transcription data 320 including transcribed clearance communication and its associated contextual data, the audio sample 322 that contains the audio from which the respective transcribed clearance communication was derived, the automatically assigned phraseology pattern metadata for the respective transcribed clearance communication (e.g., phraseology data 324), and the ground truth text (e.g., ground truth corpus 326) associated with the respective transcribed clearance communication.

In one or more implementations, the transcription characterization process 400 repeats the steps of by analyzing the ground truth text of the audio clearance communication to automatically classify the ground truth text of the clearance communication into one or more categories of phraseology pattern metadata (e.g., task 408) and automatically assign a phraseology pattern identifier to the ground truth text of the clearance communication (e.g., task 410). In this regard, the transcription characterization service 310 utilizes the same NLP, AI, parts of speech tagging, position tagging, machine learning and/or other semantic analysis techniques to classify or otherwise assign metadata to the ground text in an equivalent manner as is done for the automatically transcribed clearance communication to support determining performance metrics 328 associated with the transcribed clearance communication based on the relationship between the automatically assigned pattern phraseology data 324 associated with the transcribed clearance communication and the corresponding pattern phraseology data 324 for the ground truth version. In such implementations, the data storage 308 stores or otherwise maintains the automatically assigned phraseology pattern metadata for the respective ground truth text in association with the ground truth text and the corresponding transcribed clearance communication for subsequent analysis.

Figure 5:
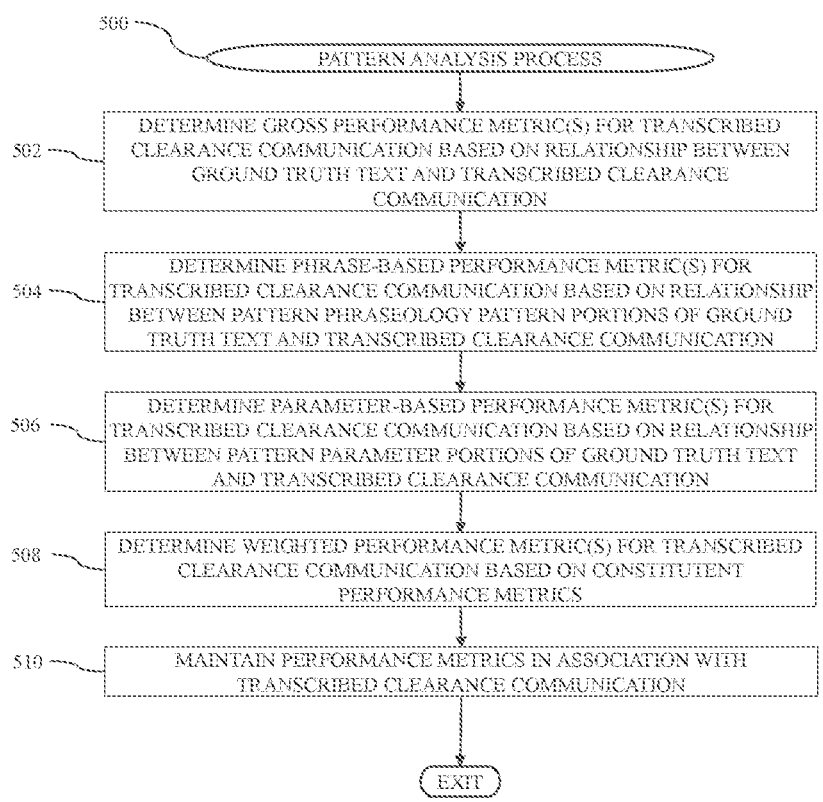
FIG. 5 is a flow diagram illustrating a pattern analysis process suitable for implementation by the system of FIG. 3 in connection with the transcription characterization process of FIG. 4 in accordance with one or more exemplary embodiments.

FIG. 5 depicts an exemplary embodiment of a pattern analysis process 500 suitable for use in connection with the transcription characterization process 400 of FIG. 4 to determine performance metrics associated with transcribed clearance communications that include an identified phraseology pattern. The various tasks performed in connection with the pattern analysis process 500 may be implemented using hardware, firmware, software executed by processing circuitry, or any combination thereof. For illustrative purposes, the following description may refer to elements mentioned above in connection with FIGS. 1-3. In practice, portions of the pattern analysis process 500 may be performed by different elements of the systems 100, 200, 300; however, for purposes of explanation, the pattern analysis process 500 may be described herein primarily in the context of being implemented by the remote server 304 and/or the pattern analysis service 312. It should be appreciated that the pattern analysis process 500 may include any number of additional or alternative tasks, the tasks need not be performed in the illustrated order and/or the tasks may be performed concurrently, and/or the pattern analysis process 500 may be incorporated into a more comprehensive procedure or process having additional functionality not described in detail herein. Moreover, one or more of the tasks shown and described in the context of FIG. 5 could be omitted from a practical embodiment of the pattern analysis process 500 as long as the intended overall functionality remains intact.

Referring to FIG. 5, with continued reference to FIGS. 1-3, in the illustrated implementation, the pattern analysis process 500 initializes or otherwise begins by calculating or otherwise determining one or more gross performance metrics associated with a respective transcribed clearance communication based on the relationship between the transcribed clearance communication and its corresponding ground truth text (task 502). In this regard, the gross performance metrics represent the performance of the clearance transcription application 220 using the speech recognition model(s) 212 and/or the speech recognition vocabulary 228 at the time the respective clearance communication was received with respect to the entirety of the transcribed clearance communication, including transcribed words, values or phrases that may be operationally insignificant. For example, the pattern analysis service 312 may calculate or otherwise determine a gross word error rate based on the similarities and/or differences between the full text of the transcribed clearance communication and the corresponding ground truth text. In one or more implementations, the pattern analysis service 312 also calculates or otherwise determines one or more performance metrics based on relationships between the phraseology pattern metadata assigned to the transcribed clearance communication and the corresponding ground truth text. For example, the pattern analysis service 312 when the assigned phraseology pattern subject category for the transcribed clearance communication matches the phraseology pattern subject category derived from the ground truth text, the pattern analysis service 312 may assign a value of 1 (or 100%) to a phraseology pattern subject category performance metric associated with the transcribed clearance communication. Conversely, when there is a mismatch between the assigned phraseology pattern subject categories, the pattern analysis service 312 may assign a value of 0 (or 0%) to a phraseology pattern subject category performance metric associated with the transcribed clearance communication. In a similar manner, the pattern analysis service 312 may determine corresponding performance metrics based on the degree of similarity or difference between the assigned phraseology pattern structure type, the assigned phraseology pattern type, the assigned phraseology pattern identifier, and/or the like.

In addition to gross performance metrics, the pattern analysis process 500 calculates or otherwise determines one or more phrase-based performance metrics associated with the respective transcribed clearance communication based on the relationship between the identified phraseology pattern portion of the transcribed clearance communication and the corresponding identified phraseology pattern portion of the ground truth text (task 504). In this regard, rather than considering the entirety of the transcribed clearance communication, the phrase-based performance metrics reflect the performance of the clearance transcription application 220 using the speech recognition model(s) 212 and/or the speech recognition vocabulary 228 at the time the respective clearance communication was received only with respect to the phraseology pattern portion of the clearance communication that is likely to be operationally significant. In other words, the phrase-based performance metrics exclude or otherwise do not consider portions of the transcribed clearance communication that are not part of the identified phraseology pattern which may be operationally insignificant. In this manner, the phrase-based performance metrics provide a more granular measure of the speech recognition performance with respect to an operationally significant portion of the transcription.

For example, the pattern analysis service 312 may calculate or otherwise determine a phrase-based word error rate based on the similarities and/or differences between only the phraseology pattern portion of the text of the transcribed clearance communication and the corresponding phraseology pattern portion of the ground truth text. Thus, if the full clearance communication includes 10 words, but the identified phraseology pattern portion of the transcribed clearance communication only includes 3 words, the pattern analysis service 312 calculates the phrase-based word error rate based on the relationship between those 3 words of the transcribed clearance communication and the corresponding identified phraseology pattern portion within the ground truth text. As a result, the phrase-based word error rate may be greater than or less than the gross word error rate. For example, when the identified phraseology pattern portions match, the phrase-based word error rate may be 0% (or alternatively, the phrase-based word accuracy rate may be 100%), but the gross word error rate may be higher when there is a mismatch among other non-phraseology pattern portions of the transcribed clearance communication and/or the ground truth text.

Still referring to FIG. 5, in addition to gross performance metrics and phrase-based performance metrics, for clearance communications assigned to the pattern plus data phraseology pattern structure type, the pattern analysis process 500 also calculates or otherwise determines one or more parameter-based performance metrics associated with the respective transcribed clearance communication based on the relationship between the data or parameter portion of the transcribed clearance communication that is associated with the identified phraseology pattern (task 506). In this regard, the parameter-based performance metrics reflect the performance of the clearance transcription application 220 using the speech recognition model(s) 212 and/or the speech recognition vocabulary 228 at the time the respective clearance communication was received solely with respect to alphanumeric values or data that define a parameter associated with the identified phraseology pattern. In other words, the parameter-based performance metrics exclude or otherwise do not consider the phraseology pattern portion of the transcribed clearance communication or other portions of the transcribed clearance communication that may be operationally insignificant and are confined to consideration of the operational parameter associated with the phraseology pattern.

For example, if the identified phraseology pattern is realized as a clearance instruction to fly a particular heading (e.g., "fly heading") that includes a sequence of three digits following the phraseology pattern that define the value for the heading parameter to be flown, the pattern analysis service 312 may calculate or otherwise determine a parameter-based word error rate based on the similarities and/or differences between the three digits following the "fly heading" portion of the text of the transcribed clearance communication and the corresponding digits following the "fly heading" portion of the ground truth text. In this manner, the parameter-based word error rate may provide a more granular assessment of the performance of the speech recognition system with respect to the alphanumeric values or other parameter data relative to the gross performance metrics and/or the phrase-based performance metrics. For example, if the transcribed clearance communication is "FLY HEADING ONE TWO ZERO" and the ground truth text is "FLY HEADING TWO TWO ZERO," the gross word error rate may be calculated as 20% (or 80% accurate) and the phrase-based word error rate may be calculated as 0% (or 100% accurate) based on the "fly heading" phraseology pattern portion matching across transcriptions, but the parameter-based word error rate may be calculated as 33% (or 67% accurate) due to the mismatch of one out of three digits of the phraseology pattern parameter portion of the transcriptions. Additionally, or alternatively, in some embodiments, inaccurate parameter portion of the transcriptions may be penalized to reflect that any amount of inaccuracy deviates from the intent of the communication, for example, by setting the parameter-based word error rate to 100% (or 0%) given that the intent of the communication "FLY HEADING ONE TWO ZERO" was to direct the pilot to fly heading at 120° and not 220°. In other words, some embodiments may utilize phrase-based performance metrics that are also intent-based or otherwise account for semantics.

Still referring to FIG. 5, in exemplary implementations, the pattern analysis process 500 calculates or otherwise determines one or more weighted performance metrics associated with the transcribed clearance communication based on the constituent performance metrics (task 508). In this regard, the pattern analysis service 312 may calculate or otherwise determine one or more aggregate performance metrics that achieve a desired weighting or tradeoff between the more granular phrase-based performance and parameter-based performance metrics and the overall performance of the speech recognition system. As one example, the weighted performance metric is determined as a weighted average of the phrased-based performance metric and the parameter-based performance metric, where the relative weightings assigned to the phrase- and parameter-based metrics may be different or vary (e.g., depending on the type of pattern, etc.) to preferentially weight one of the phrase or parameter-based performance metrics over the other. For example, the phrase-based performance metric may be assigned a weighting factor of one and the parameter-based performance metric may be assigned a weighting factor of two, such that the parameter-based performance is weighed twice as heavily in the weighted aggregate performance metric. Thus, continuing the above example, given a ground truth of "FLY HEADING ONE TWO ZERO" including the phraseology pattern "FLY HEADING <heading>" and a transcription of "FLY HEADING TWO TWO ZERO," the phrase-based performance metric may be determined as 100% (e.g., transcribed phraseology pattern portion "FLY HEADING" matching the phraseology pattern portion in the phraseology pattern "FLY HEADING <heading>" identified from the ground truth) but the parameter-based performance metric may be determined as 67%, resulting in a weighted aggregate performance metric of 78% when the phrase-based performance metric is assigned a weighting factor of one and the parameter based performance metric is assigned a weighting factor of two. In another embodiment where intent-based, phrase-based performance metrics are utilized, the parameter-based word error rate may be determined as 0% accurate given the mismatch between the transcribed heading parameter and the ground truth heading parameter, resulting in a weighted aggregate performance metric of 33% when the phrase-based performance metric is assigned a weighting factor of one and the intent-based, parameter-based performance metric is assigned a weighting factor of two.

Still referring to FIG. 5, the pattern analysis process 500 stores or otherwise maintains the various performance metrics (e.g., gross, pattern-based, parameter-based and weighted) in association with the transcribed clearance communication for subsequent analysis (task 510). In this regard, the remote server 304 and/or the pattern analysis service 312 creates a record or entry at the data storage 308 that stores or otherwise maintains the calculated performance metrics 328 in association with the corresponding transcription data 320, audio sample 322, phraseology pattern data 324 and ground truth text 326.

Figure 6:
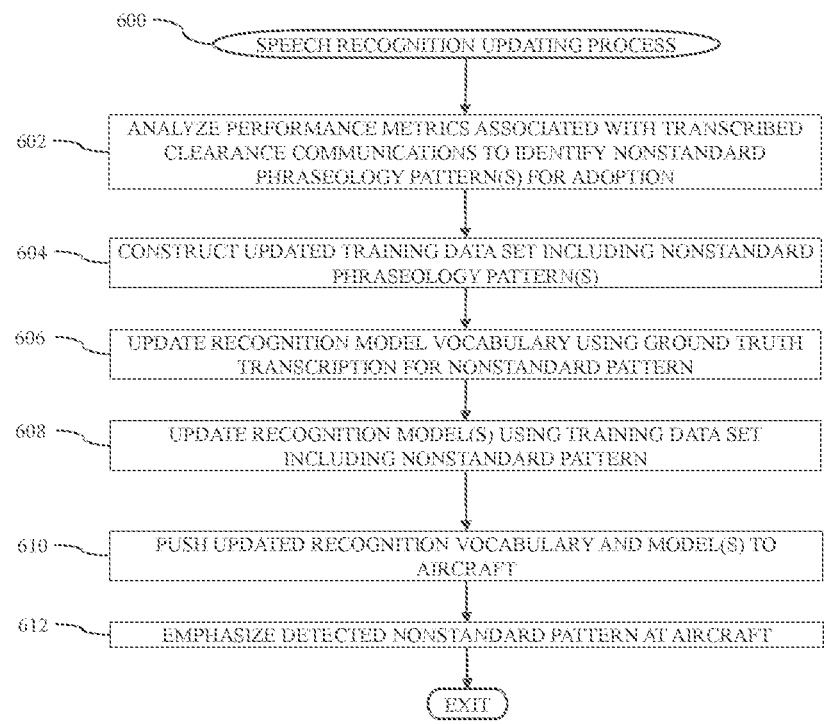
FIG. 6 is a flow diagram illustrating a speech recognition updating process suitable for implementation by the system of FIG. 3 in connection with the pattern analysis process of FIG. 5 in accordance with one or more exemplary embodiments.

FIG. 6 depicts an exemplary embodiment of a speech recognition updating process 600 suitable for use in connection with the transcription characterization process 400 of FIG. 4 and/or the pattern analysis process 500 of FIG. 5 to adaptively update the speech recognition system to improve performance with respect to identified phraseology patterns. The various tasks performed in connection with the speech recognition updating process 600 may be implemented using hardware, firmware, software executed by processing circuitry, or any combination thereof. For illustrative purposes, the following description may refer to elements mentioned above in connection with FIGS. 1-3. In practice, portions of the speech recognition updating process 600 may be performed by different elements of the systems 100, 200, 300; however, for purposes of explanation, the speech recognition updating process 600 may be described herein primarily in the context of being implemented by the remote server 304 and/or the speech recognition development service 314. It should be appreciated that the speech recognition updating process 600 may include any number of additional or alternative tasks, the tasks need not be performed in the illustrated order and/or the tasks may be performed concurrently, and/or the speech recognition updating process 600 may be incorporated into a more comprehensive procedure or process having additional functionality not described in detail herein. Moreover, one or more of the tasks shown and described in the context of FIG. 6 could be omitted from a practical embodiment of speech recognition updating process 600 as long as the intended overall functionality remains intact.

In exemplary implementations, the speech recognition updating process 600 is periodically performed (e.g., weekly, monthly, yearly, etc.) to dynamically and adaptively update the speech recognition vocabulary and/or the speech recognition model(s) over time as transcribed clearance communications are ingested from different instances of aircraft 120, 302. In this regard, as transcribed clearance communications are uploaded from different instances of aircraft 120, 302, the remote server 304 executes, performs or otherwise implements the transcription characterization process 400 and pattern analysis process 500 to automatically classify or otherwise assign different phraseology pattern metadata to the respective transcribed clearance communications and determine corresponding performance metrics for respective ones of the transcribed clearance communications where corresponding ground truth text is available. After aggregating the transcription data 320, audio samples 322, phraseology pattern metadata 324 and ground truth text 326 and determining performance metrics 328 associated with the transcribed clearance communications, the remote server 304 and/or the speech recognition development service 314 initiates, executes, performs or otherwise implements the speech recognition updating process 600 to adaptively update the speech recognition vocabularies (e.g., clearance vocabulary 228) and/or the speech recognition models (e.g., speech recognition model 212) to be utilized by a speech recognition system (e.g., transcription system 202) at an edge device (e.g., aircraft 120, 302) to reflect the observed phraseology patterns exhibited by the transcribed clearance communications in a manner that is influenced by the performance metrics 328 associated with the transcribed clearance communications. In this regard, the speech recognition updating process 600 may be performed to update speech recognition vocabularies to add, include or otherwise incorporate new custom or nonstandard phraseology patterns having observed usage that may not be previously defined by applicable phraseology standards (e.g., phraseology standards 226), delete or otherwise remove phraseology patterns lacking observed usage, and/or adaptively update or retrain the acoustic models and/or the language models to better reflect the phraseology patterns having observed usage.

Referring to FIG. 6, with continued reference to FIGS. 1-3, the illustrated implementation of the speech recognition updating process 600 begins by analyzing the performance metrics associated with the transcribed clearance communications to identify one or more nonstandard phraseology patterns with observed usage for formal adoption to the speech recognition system (task 602). In this regard, the speech recognition development service 314 may analyze the transcription data 320 and the phraseology pattern metadata 324 to identify the recurrence of a particular nonstandard phraseology pattern, where the performance metrics 328 associated with the recurrent nonstandard phraseology pattern indicates that the speech recognition system should be adapted to account for the recurrent nonstandard phraseology pattern. For example, in one implementation, the speech recognition development service 314 selects a nonstandard phraseology pattern for incorporation in the speech recognition vocabulary when the number of occurrences of the nonstandard phraseology pattern over a preceding period of time exceeds a threshold number of occurrences, and one or more performance metrics associated with the nonstandard phraseology pattern indicate the performance of the speech recognition system with respect to that nonstandard phraseology pattern is less than a minimum threshold level of performance. In this regard, the speech recognition system may be adapted to incorporate new or custom nonstandard phraseology patterns that are regularly used by pilots or air traffic controllers, so that the speech recognition system better reflects actual usage. In a similar manner, the speech recognition development service 314 may identify phraseology patterns for removal from the speech recognition vocabulary when the number of occurrences of the phraseology pattern over a preceding period of time is below a threshold number of occurrences or the amount of time elapsed since the most recent usage of the respective phraseology pattern is greater than a threshold amount of time. Thus, the speech recognition system may also be adapted to deemphasize obsolete phraseology patterns that are not used by pilots or air traffic controllers. Additionally, in scenarios where specific phraseology patterns are prevalent in certain geographic regions only, the speech recognition vocabulary and/or speech recognition models may be region-specific (e.g., incorporating region specific phraseology patterns) to improve performance in terms of time and accuracy when operating in those regions, while those same phraseology patterns may be absent from the speech recognition vocabulary and/or speech recognition models for other geographic regions where the phraseology patterns is not in use to performance in those other regions.

In one or more implementations, the speech recognition system is configurable to support contextual speech recognition vocabularies and/or speech recognition models, such that the speech recognition development service 314 adaptively updates the speech recognition system on a context-sensitive basis. In this regard, new or custom nonstandard phraseology patterns that are only used in particular geographic regions may be adaptively incorporated into the speech recognition vocabularies and/or speech recognition models that are associated with or otherwise encompass those geographic regions, without being incorporated into speech recognition vocabularies and/or speech recognition models that are associated with different geographic regions or global, context-independent speech recognition vocabularies and/or speech recognition models.

Referring again to FIG. 6, after identifying nonstandard phraseology patterns for adoption, the speech recognition updating process 600 creates, generates or otherwise constructs an updated set of training data including one or more nonstandard phraseology pattern(s) (task 604). In this regard, the speech recognition development service 314 selects or otherwise obtains the transcription data 320, audio samples 322, phraseology pattern metadata 324 and ground truth text 326 associated with the transcribed clearance communications including nonstandard phraseology patterns that were selected or otherwise identified for adoption by the speech recognition system to update the training data set for updating the speech recognition models to include the nonstandard phraseology patterns. Additionally, in some implementations, the speech recognition development service 314 also selects or otherwise obtains the transcription data 320, audio samples 322, phraseology pattern metadata 324 and ground truth text 326 associated with the transcribed clearance communications including standard phraseology patterns or previously-adopted nonstandard phraseology patterns where the performance metrics 328 associated with those transcribed clearance communications indicate the performance of the speech recognition system could be improved. In this regard, when the speech recognition system fails to achieve the desired level of performance with respect to a transcribed clearance communication that includes a standard phraseology pattern or other nonstandard phraseology pattern that has already been incorporated in the speech recognition vocabulary (e.g., due to background noise, speaker accent or dialect, etc.), the speech recognition development service 314 may select the transcription data 320, audio samples 322, phraseology pattern metadata 324 and ground truth text 326 associated with those transcribed clearance communications for inclusion in the updated training data set to adaptively improve the performance of the speech recognition system (e.g., to provide better immunity with respect to noise or regional speech variations). In this manner, the speech recognition development service 314 may adaptively update the training data set to include new nonstandard phraseology patterns or more challenging real-world transcription environments. Additionally, in some implementations, the speech recognition development service 314 may adaptively remove unused or obsolete phraseology patterns from the training data set, thereby excluding or deemphasizing unused or obsolete phraseology patterns in subsequent updates.

Still referring to FIG. 6, the illustrated speech recognition updating process 600 continues by augmenting or otherwise updating the vocabulary used by the speech recognition model to include words or phrases from the ground truth transcription of the nonstandard phraseology pattern(s) to be adopted (task 606). In this regard, the speech recognition development service 314 may determine an updated version of the clearance vocabulary 228 that includes the identified nonstandard phraseology pattern from the ground truth text 326 associated with the transcribed clearance communications including the nonstandard phraseology pattern to be added. Additionally, as described above, in some implementations, the speech recognition development service 314 may determine an updated version of the clearance vocabulary 228 that excludes obsolete or unused phraseology patterns, for example, by removing words or phrases corresponding to those unused phraseology patterns from the clearance vocabulary 228.

After updating the vocabulary used by the speech recognition model, the speech recognition updating process 600 continues by retraining, redeveloping or otherwise updating one or more of the speech recognition modules using the constructed training data set including the nonstandard phraseology pattern(s) in conjunction with the updated recognition vocabulary (task 608). In this regard, the speech recognition development service 314 utilizes AI, NLP or other machine learning techniques to update the acoustic model and/or the language model to be utilized by the transcription system 202 based on the relationship between the audio samples 322 and the corresponding ground truth text 326 of the training data set to minimize the differences (or costs) between the resulting transcriptions and phraseology pattern assignments that would result from the updated acoustic model and/or the updated language model and the ground truth text 326 and phraseology pattern assignments derived from the ground truth text 326.

Figure 7:
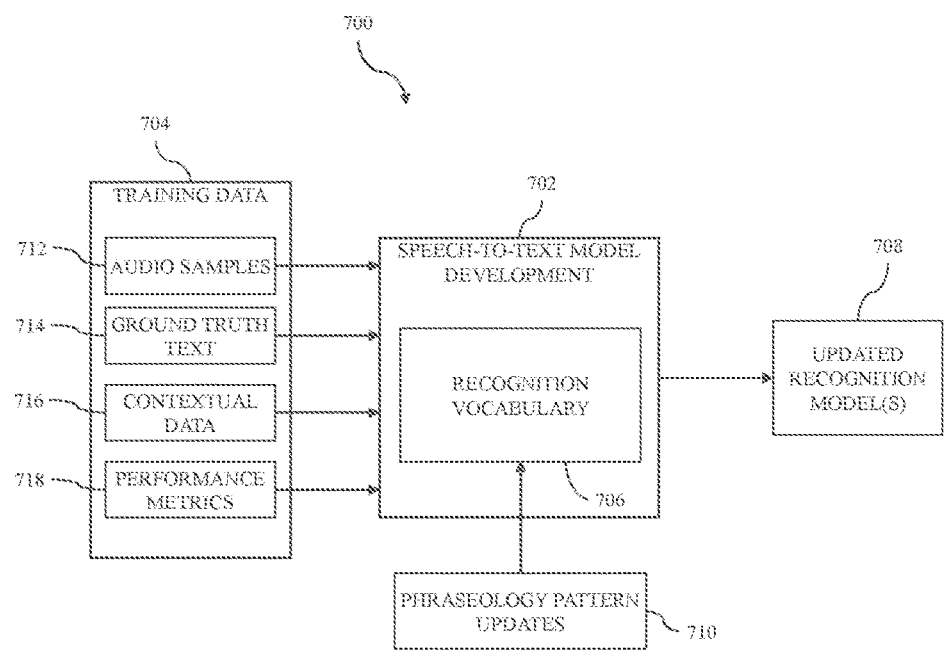
FIG. 7 is a block diagram of a speech recognition development service suitable for implementation by the system of FIG. 3 in connection with the speech recognition updating process of FIG. 6 in accordance with one or more exemplary embodiments.

FIG. 7 depicts an exemplary implementation of a speech recognition development service 700 suitable for implementation by the remote server 304 (e.g., as speech recognition development service 314) in connection with the speech recognition updating process 600 of FIG. 6. The speech recognition development service 700 includes a speech-to-text model development engine 702 that utilizes AI, NLP or other machine learning techniques to develop one or more speech recognition models 708 for converting input audio into a corresponding textual representation based on an input set of training data 704 and a recognition vocabulary 706 (e.g., clearance vocabulary 228). Referring to FIG. 7 with continued reference to FIGS. 1-6, as described above, based on the performance metrics 328 associated with the different transcribed clearance communications maintained at the data storage 308, the speech recognition development service 700 identifies phraseology pattern updates 710 to be incorporated into the recognition vocabulary 706 (e.g., task 602) and updates the recognition vocabulary 706 to reflect those phraseology pattern updates 710 (e.g., task 606), for example, by adding new nonstandard phraseology patterns to the recognition vocabulary 706 and/or removing obsolete phraseology patterns from the recognition vocabulary 706. Based on the weighted aggregate performance metrics, specific improvements to the speech recognition model could be undertaken, for example, by increasing the amount of training data used to develop or update the speech recognition model to include more examples of nonstandard phraseology patterns that occur with significant frequency but have poor weighted aggregate performance metrics.

The speech-to-text model development engine 702 represents the software or other computer-executable instructions that are executed by the remote server 304 to analyze the constructed training data set 704 (e.g., task 604), where each entry in the training data set 704 includes an audio sample 712 of a respective clearance communication (e.g., audio sample 322), a ground truth text 714 representation of the content of the respective audio sample 712 (e.g., ground truth text 326), contextual data 716 associated with the respective clearance communication (e.g., transcription data 320), and one or more performance metrics 718 associated with a prior transcription of the respective audio sample 712 (e.g., performance metrics 328). The speech-to-text model development engine 702 then utilizes AI, NLP and/or machine learning techniques to derive one or more updated recognition models 708 (e.g., acoustic and/or language models) that minimize the cost, difference or error rate associated with the transcribed clearance communication that would be output by the recognition model 708 for a respective audio sample 712 and the corresponding ground truth text 714 for that respective audio sample 714 using the recognition vocabulary 706. In this regard, the speech-to-text model development engine 702 may iteratively adjust or update the recognition model(s) 708 until the resulting performance of the updated recognition model(s) 708 meets or exceeds the performance metrics 718 associated with the input training data set 704. Additionally, the speech-to-text model development engine 702 may utilize one or more variables of the contextual data 716 in the resulting recognition model(s) 708 to recognize nonstandard phraseology patterns in a manner that is influenced by the geographic region, flight phase, or the like to provide context-specific recognition model(s) 708. In this regard, some implementations may utilize context-specific or location-specific versions of the recognition vocabulary 706 along with context-specific or location-specific versions of the recognition model(s) 708 to provide improved performance with respect to nonstandard phraseology patterns that occur in particular geographic regions, particular flight phases, or other contexts.

Referring again to FIG. 6, in exemplary implementations, after updating the recognition vocabulary and model(s) for the speech recognition system, the speech recognition updating process 600 automatically pushes or otherwise transmits the updated recognition vocabulary and model(s) for the speech recognition system to different aircraft or other edge devices (task 610). For example, the remote server 304 and/or the speech recognition development service 314 may automatically push updates to the recognition models 212 and/or the clearance vocabulary 228 to the transcription system 202 at the aircraft 120, 302 or other edge device over the network 306, thereby dynamically and adaptively updating the speech recognition system 200 at the aircraft 120, 302 or other edge device.

After updating the recognition vocabulary and model(s) of the speech recognition system a given aircraft or edge device, the updated speech recognition system may be utilized to automatically detect and emphasize a detected nonstandard phraseology pattern received at the aircraft (task 612). For example, when an aircraft 120, 302 is operating in a geographic region where a newly adopted nonstandard phraseology pattern is more likely to be used, and the aircraft 120, 302 receives a clearance communication from an ATC in that geographic region that includes the newly adopted nonstandard phraseology pattern, the clearance transcription application 220 at the transcription system 202 may more accurately or more reliably transcribe that clearance communication when converting the received audio clearance communication into a corresponding transcribed clearance communication. Moreover, the transcription analyzer 230 at the transcription system 202 may detect or otherwise identify the nonstandard phraseology pattern within the transcribed clearance communication based on the updated clearance vocabulary 228 and respond to the transcribed clearance communication in a manner that emphasizes or otherwise indicates the use of a potentially operationally significant phraseology pattern. For example, the transcription analyzer 230 may provide commands, signals or other instructions to an onboard system 208 (e.g., display system 108) to generate or otherwise provide a graphical representation of the transcribed clearance communication on the display device 102 in a manner that emphasizes the detected nonstandard phraseology pattern, for example, by rendering the nonstandard phraseology pattern portion of the text of the transcribed clearance communication in a conversation log or other GUI display including a listing of transcribed clearance communications using one or more visually distinguishable characteristics (e.g., a visually distinguishable color, bolding, underlining, font style, and/or the like). For example, in a transcribed ATC clearance communication of "HONEYWELL FIVE SEVEN FIVE FLY ZERO THREE ZERO HEADING" that includes the nonstandard phraseology pattern of "FLY <heading> HEADING," in response to detecting the nonstandard phraseology pattern of "FLY <heading> HEADING," the nonstandard phraseology pattern portion of "FLY ZERO THREE ZERO HEADING" may be bolded, highlighted, or otherwise emphasized in the graphical representation of the transcription to draw attention to the assigned heading value (e.g., 030°) even though the ATC clearance communication did not adhere to standard phraseology. In this manner, the pilot's attention may be focused on or otherwise drawn to the detected phraseology pattern to improve comprehension and/or situational awareness with respect to the received clearance communication that includes a nonstandard phraseology pattern.

It will be appreciated that the subject matter described herein provides a robust system that is capable of recognizing and detecting standard or prescribed phraseology patterns as well as commonly used variations, thereby allowing the speech recognition system to highlight operationally significant information to pilot and/or ATC even when the speech pattern or syntax deviates from a defined standard. A cloud-based remote system interacts with the edge device(s) to gather data (e.g., the recordings of the conversations between the ATC and pilot, the real-time transcriptions, etc.) and push intelligent insights and/or other updates back to the edge device(s). The cloud-based system supports identification of new conversational patterns (e.g., phrases, ICAO phrase variations, regional variations, etc.) based on the transcribed ATC clearance communications uploaded to the cloud-based system and dynamically updates the transcription system to incorporate or otherwise deploy additional intelligence to aid identification of new phraseology patterns. The performance metrics may also be utilized to provide performance dashboards or other insights for pilots, ATCs, and/or the like.

In various embodiments, the system is capable of enabling dynamic and/or substantially real-time identification of specific conversational patterns in the conversations between ATC and pilot(s), mapping identified conversational patterns to existing prevalent patterns, and detecting and flagging new conversational patterns. Additionally, the system is capable of mapping clearance and corresponding readback patterns and validating the data therein to reduce readback and/or hearback errors and to build a robust readback interpretation system capable of identifying operationally significant information in the conversational patterns. The subject matter described herein also enables fine-tuning based on the recognized conversation patterns and relevant performance benchmarks and assessing the extent of adoption and conformance of relevant standards (e.g., ICAO standards) as applicable to ATC-pilot conversations. Moreover, lack of usage, obsolescence and variations with respect to existing standards or norms may be leveraged to tune the speech recognition models utilized for ATC transcription. Likewise, conversation patterns and the respective performance metrics associated therewith may be utilized to update or recommend new communications practices or standards.

For the sake of brevity, conventional techniques related to graphical user interfaces, graphics and image processing, speech recognition, artificial intelligence, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of a vehicle, the method comprising:
   analyzing a transcription of an audio communication with respect to the vehicle to characterize a nonstandard pattern within the transcription of the audio communication;
   obtaining a ground truth for the transcription of the audio communication;
   determining one or more performance metrics associated with the nonstandard pattern within the transcription based on a relationship between the transcription of the audio communication and the ground truth for the transcription;
   updating a speech recognition vocabulary for the vehicle to include the nonstandard pattern based at least in part on the one or more performance metrics, resulting in an updated speech recognition vocabulary; and
   determining an updated speech recognition model for the vehicle using the updated speech recognition vocabulary and the audio communication.

2. The method of claim 1, further comprising pushing the updated speech recognition model to the vehicle over a communications network.

3. The method of claim 2, further comprising analyzing, at the vehicle, a second transcription of a subsequent audio communication with respect to the vehicle to detect the nonstandard pattern within the second transcription of the subsequent audio communication using at least one of the updated speech recognition vocabulary and the updated speech recognition model.

4. The method of claim 1, further comprising analyzing a second transcription of a subsequent audio communication with respect to the vehicle to detect the nonstandard pattern within the second transcription of the subsequent audio communication using at least one of the updated speech recognition vocabulary and the updated speech recognition model.

5. The method of claim 1, wherein analyzing the transcription of the audio communication with respect to the vehicle to characterize the nonstandard pattern within the transcription of the audio communication comprises:
   determining at least one of a phraseology pattern subject category and a phraseology pattern structure type associated with the transcription of the audio communication based at least in part on content of the transcription of the audio communication;
   determining whether the content of the transcription of the audio communication corresponds to one of a plurality of standard phraseology patterns based at least in part on the at least one of the phraseology pattern subject category and the phraseology pattern structure type; and
   determining the transcription of the audio communication comprises the nonstandard pattern when the transcription of the audio communication does not correspond to any of the plurality of standard phraseology patterns.

6. The method of claim 5, further comprising assigning a pattern identifier associated with an existing nonstandard pattern to the transcription of the audio communication when the content of the transcription of the audio communication corresponds to the existing nonstandard pattern based at least in part on the at least one of the phraseology pattern subject category and the phraseology pattern structure type.

7. The method of claim 1, wherein:
analyzing the transcription of the audio communication with respect to the vehicle to characterize the nonstandard pattern comprises identifying a phraseology pattern portion associated with the nonstandard pattern within the transcription of the audio communication; and
determining the one or more performance metrics associated with the nonstandard pattern within the transcription comprises determining a phraseology pattern performance metric based on a relationship between the phraseology pattern portion of the transcription of the audio communication and a second phraseology pattern portion of the ground truth.

8. The method of claim 1, wherein:
determining the one or more performance metrics comprises determining a pattern-based performance metric associated with the nonstandard pattern within the transcription based on a relationship between a phraseology pattern portion of the transcription of the audio communication and the phraseology pattern portion of the ground truth for the transcription; and
updating the speech recognition vocabulary comprises updating the speech recognition vocabulary based on the pattern-based performance metric.

9. A non-transitory computer-readable medium having computer-executable instructions stored thereon that, when executed by a processing system, cause the processing system to:
analyze a transcription of an audio communication with respect to a vehicle to characterize a nonstandard pattern within the transcription of the audio communication;
obtain a ground truth for the transcription of the audio communication;
determine one or more performance metrics associated with the nonstandard pattern within the transcription based on a relationship between the transcription of the audio communication and the ground truth for the transcription;
update a speech recognition vocabulary to include the nonstandard pattern based at least in part on the one or more performance metrics, resulting in an updated speech recognition vocabulary; and
determine an updated speech recognition model for the vehicle using the updated speech recognition vocabulary and the audio communication.

10. The non-transitory computer-readable medium of claim 9, wherein the computer-executable instructions cause the processing system to push the updated speech recognition model to the vehicle over a communications network.

11. The non-transitory computer-readable medium of claim 9, wherein the computer-executable instructions cause the processing system to analyze a second transcription of a subsequent audio communication with respect to the vehicle to detect the nonstandard pattern within the second transcription of the subsequent audio communication using at least one of the updated speech recognition vocabulary and the updated speech recognition model.

12. The non-transitory computer-readable medium of claim 9, wherein the computer-executable instructions cause the processing system to analyze the transcription of the audio communication with respect to the vehicle to characterize the nonstandard pattern within the transcription of the audio communication by:
determining at least one of a phraseology pattern subject category and a phraseology pattern structure type associated with the transcription of the audio communication based at least in part on content of the transcription of the audio communication;
determining whether the content of the transcription of the audio communication corresponds to one of a plurality of standard phraseology patterns based at least in part on the at least one of the phraseology pattern subject category and the phraseology pattern structure type; and
determining the transcription of the audio communication comprises the nonstandard pattern when the transcription of the audio communication does not correspond to any of the plurality of standard phraseology patterns.

13. The non-transitory computer-readable medium of claim 12, wherein the computer-executable instructions cause the processing system to assign a pattern identifier associated with an existing nonstandard pattern to the transcription of the audio communication when the content of the transcription of the audio communication corresponds to the existing nonstandard pattern based at least in part on the at least one of the phraseology pattern subject category and the phraseology pattern structure type.

14. The non-transitory computer-readable medium of claim 9, wherein:
analyzing the transcription of the audio communication with respect to the vehicle to characterize the nonstandard pattern comprises identifying a phraseology pattern portion associated with the nonstandard pattern within the transcription of the audio communication; and
determining the one or more performance metrics associated with the nonstandard pattern within the transcription comprises determining a phraseology pattern performance metric based on a relationship between the phraseology pattern portion of the transcription of the audio communication and a second phraseology pattern portion of the ground truth.

15. The non-transitory computer-readable medium of claim 9, wherein the computer-executable instructions cause the processing system to:
determine a pattern-based performance metric associated with the nonstandard pattern within the transcription based on a relationship between a phraseology pattern portion of the transcription of the audio communication and the phraseology pattern portion of the ground truth for the transcription; and
update the speech recognition vocabulary to include the nonstandard pattern based on the pattern-based performance metric.

16. A computing device comprising:
at least one computer-readable storage medium to store computer-executable instructions; and
at least one processor, coupled to the at least one computer-readable storage medium, to execute the computer-executable instructions to:
analyze a transcription of an audio communication with respect to a vehicle to characterize a nonstandard pattern within the transcription of the audio communication;

obtain a ground truth for the transcription of the audio communication;

determine one or more performance metrics associated with the nonstandard pattern within the transcription based on a relationship between the transcription of the audio communication and the ground truth for the transcription;

update a speech recognition vocabulary to include the nonstandard pattern based at least in part on the one or more performance metrics, resulting in an updated speech recognition vocabulary; and determine an updated speech recognition model for the vehicle using the updated speech recognition vocabulary and the audio communication.

17. The computing device of claim 16, wherein the computer-executable instructions cause the at least one processor to push the updated speech recognition model to the vehicle over a communications network.

18. The computing device of claim 16, wherein the computer-executable instructions cause the at least one processor to analyze a second transcription of a subsequent audio communication with respect to the vehicle to detect the nonstandard pattern within the second transcription of the subsequent audio communication using at least one of the updated speech recognition vocabulary and the updated speech recognition model.

19. The computing device of claim 16, wherein the computer-executable instructions cause the at least one processor to:

identify a phraseology pattern portion associated with the nonstandard pattern within the transcription of the audio communication; and determine a phraseology pattern performance metric based on a relationship between the phraseology pattern portion of the transcription of the audio communication and a second phraseology pattern portion of the ground truth.

20. The computing device of claim 16, wherein the computer-executable instructions cause the at least one processor to:

determine a pattern-based performance metric associated with the nonstandard pattern within the transcription based on a relationship between a phraseology pattern portion of the transcription of the audio communication and the phraseology pattern portion of the ground truth for the transcription; and update the speech recognition vocabulary based on the pattern-based performance metric.

* * * * *